(12) United States Patent
Reiffin

(10) Patent No.: US 6,330,583 B1
(45) Date of Patent: Dec. 11, 2001

(54) COMPUTER NETWORK OF INTERACTIVE MULTITASKING COMPUTERS FOR PARALLEL PROCESSING OF NETWORK SUBTASKS CONCURRENTLY WITH LOCAL TASKS

(76) Inventor: Martin Reiffin, 5439 Blackhawk Dr., Danville, CA (US) 94506

(*) Notice: Subject to any disclaimer, the term of this patent is extended or adjusted under 35 U.S.C. 154(b) by 0 days.

(21) Appl. No.: 08/303,763

(22) Filed: Sep. 9, 1994

(51) Int. Cl.[7] .............................. G06F 9/38; G06F 9/40; G06F 9/48; G06F 9/50
(52) U.S. Cl. ..................... 709/105; 709/106; 709/107; 709/108; 712/29; 712/30; 710/261; 710/264
(58) Field of Search ..................... 712/28, 32, 13, 712/18, 29, 30, 14, 228, 37, 90, 31; 709/102, 106, 103, 107, 104, 105, 108, 201, 400, 205, 213, 226, 214, 215, 1, 101, 217, 251; 710/20, 129, 261, 266, 264

(56) References Cited

U.S. PATENT DOCUMENTS

| | | | | |
|---|---|---|---|---|
| 4,203,153 | * | 5/1980 | Boyd | 395/750 |
| 4,430,699 | * | 2/1984 | Segara et al. | 395/200.03 |
| 4,466,065 | * | 8/1984 | Advani et al. | 395/275 |
| 4,545,015 | * | 10/1985 | Baunach et al. | 364/419.1 |
| 4,768,149 | * | 8/1988 | Konopik et al. | 395/275 |
| 4,879,733 | * | 11/1989 | Burch et al. | 377/44 |
| 4,925,311 | * | 5/1990 | Neches et al. | 395/650 |
| 4,949,254 | * | 8/1990 | Shorter | 364/200 |
| 5,001,666 | * | 3/1991 | Thompson et al. | 395/775 |
| 5,062,037 | * | 10/1991 | Shorter et al. | 395/200 |
| 5,063,500 | * | 11/1991 | Shorter | 395/200.03 |
| 5,121,327 | * | 6/1992 | Salazar | 364/464.02 |
| 5,247,677 | * | 9/1993 | Welland et al. | 395/650 |
| 5,295,264 | * | 3/1994 | Werres et al. | 709/103 |
| 5,347,477 | * | 9/1994 | Lee | 708/141 |
| 5,386,561 | * | 1/1995 | Huynh et al. | 709/103 |
| 5,402,350 | * | 3/1995 | Kline | 364/468.07 |
| 5,428,783 | * | 6/1995 | Lake | 709/106 |
| 5,428,789 | * | 6/1995 | Waldron, III | 709/213 |
| 5,469,549 | * | 11/1995 | Simpson et al. | 709/213 |
| 5,606,493 | * | 2/1997 | Duscher et al. | 364/134 |
| 5,694,603 | * | 12/1997 | Reiffin | 709/107 |
| 5,694,604 | * | 12/1997 | Reiffin | 709/107 |
| 5,799,320 | * | 8/1998 | Klug | 707/201 |
| 5,978,832 | * | 11/1999 | Sirkin | 709/107 |

OTHER PUBLICATIONS

Microsoft Press Computer Dictionary, pp. 34, 217, 266, 313, Nov. 10, 1993.*

* cited by examiner

Primary Examiner—Daniel H. Pan

(57) ABSTRACT

A local area computer network provides distributed parallel processing. The network comprises a plurality of workstations or personal computers, each having preemptive multitasking for the interactive execution of a local task in the foreground concurrently with a remote network subtask in the background. A large compute-intensive task may be partitioned into a plurality of parallel subtasks executed simultaneously with each subtask executed in the background by a respective workstations without substantial interference with the local task being executed concurrently in the foreground. The computer time and processing power which would otherwise be wasted while waiting for slow input/output operations is instead utilized to provide a powerful parallel multiprocessor system for handling compute-intensive tasks too large for an individual workstations.

10 Claims, 4 Drawing Sheets

COMPUTER NETWORK OF INTERACTIVE MULTITASKING COMPUTERS FOR PARALLEL PROCESSING OF NETWORK SUBTASKS CONCURRENTLY WITH LOCAL TASKS

This invention relates to computer networks, and more particularly, to a distributed parallel processing network system wherein a large compute-intensive task may be partitioned into subtasks which are then distributed among a plurality of personal computer or workstations for parallel execution of the subtasks in the background concurrently with the execution in the foreground of the respective local tasks of the individual workstations.

The disclosed computers of the present invention may be either those designated by the term "workstations" or those designated by the term "personal computers". In the present specification and claims these terms may be regarded as synonymous, since the invention operates in the same manner with both categories of computer. Several of the claims utilize the coined term "personal computer workstations" which is to be understood as generic to include both categories.

BACKGROUND OF THE INVENTION

In the conventional local area network comprising a plurality of interconnected workstations or personal computers most of the execution time and processing power of the computers are wasted while waiting idly for slow input/output devices. For example, in the time intervals between successive keystrokes at the keyboard a central procesing unit would be able to execute thousands of instructions if there were some way to put the unit to use instead of compelling it merely to wait for the next keystroke. Other input/output operations such as mouse movements, printing tasks and disk drive activities are similarly many orders of magnitude slower than CPU (central processing unit) operations and result in a further waste of much of the running time and computational power of the computer. Furthermore, when the CPU eventually does get the opportunity to process a keystroke code, mouse movement, printer command or disk access the CPU can finish its share of the input/output task relatively quickly so that the unit is soon back to its idle waiting state. Also, at any typical instant some of the workstations may not be operated by the respective users, thereby further contributing to the waste of computer time and power.

Another problem with conventional local area network systems is that each individual workstations or personal computer lacks the power to execute within a reasonable time those large compute-intensive applications which frequently arise in science, engineering, financial analysis, image processing and other fields. Heretofore such applications required processing either by mainframes or by network servers accessed by remote procedure calls in an expensive distributed computing environment.

OBJECTS OF THE INVENTION

It is therefore a primary object of the present invention to provide a distributed parallel processing network system which utilizes the otherwise wasted execution time and computation power of the workstations or personal computers by enabling their CPUs to perform in the background parallelized compute-intensive tasks, while concurrently peforming their local individual tasks in the foreground without any slowdown perceptible to the users.

It is a further object of the invention to provide a system wherein a network of workstations or personal computers may operate in parallel to form a powerful multicomputer system for parallel processing of large time-consuming compute-intensive applications in a fraction of the time that it would take any of the individual computers to do the job alone.

SUMMARY OF THE INVENTION

The preferred embodiment of the invention, disclosed herein as illustrative of one of the many forms which the invention may take in practise, comprises a network of interconnected workstations or personal computers each having the usual console including a keyboard and a CRT (cathode ray tube) monitor display for interactive operation by a user to perform a respective local task on each computer. Most of these local tasks are either input/output intensive or of relatively small size.

If a computer has a task which is both large and compute-intensive, the task is partitioned into a plurality of smaller subtasks to be executed simultaneously in parallel by the other computers of the network. Each of these subtasks is assigned its respective identifier. One of the network disk drives has a directory constituting a pool for storing all of the subtask identifiers, preferably in the form of a queue. Each of the other computers of the network selects a subtask identifier from the pool, copies the corresponding subtask program from the originating computer, executes the selected subtask in the background while concurrently executing its own local task in the foreground, returns the computed results of the subtask computation to the originating computer, and then selects another subtask from the pool to repeat the cycle.

Each workstations or personal computer of the network operates in a preemptive multitasking mode controlled by a clock, tick counter, interrupt controller and scheduler. The clock periodically generates ticks which are tallied by the counter until the count reaches a predetermined number of ticks equal to a timeslice of about 20 milliseconds. The counter then activates the interrupt controller which in turn activates the interrupt input pin of the CPU (central processing unit). This initiates a CPU interrupt operation which terminates the current timeslice of execution. The currently executing task is interrupted and preempted, and control of the CPU is taken away from the preempted task and passed to an interrupt service routine which contains or invokes the scheduler.

The scheduler then transfers control of the CPU to the next task to be executed during the next timeslice. If the preempted task had been a local task then the scheduler will pass control of the CPU to a remote subtask which is concurrently executing in the background. If no remote subtask is being concurrently executed then the computer searches the network directory pool for the next subtask identifier waiting in the queue, copies from the originating computer the subtask program corresponding to said next identifier, and then proceeds with the execution of this remote subtask. In either event, execution of the present subtask or a new subtask proceeds until preempted by the next interrupt terminating the new timeslice. If no remote subtask is being concurrently executed and the pool of subtask identifiers is empty then the new timeslice is aborted and control of the CPU is returned to the scheduler. Upon the termination of a timeslice of execution of a remote subtask the scheduler passes control of the CPU to the local task running interactively with the user in the foreground for execution during the next timeslice.

This preemptive multitasking mode of operation thus provides for each computer of the network a plurality of series of timeslices of execution, with the timeslices of each series interleaved with the timeslices of at least one other series. One series may consist of timeslices of execution of a local task in the foreground, and another series may consist of timeslices of execution of a remote subtask in the background, with the two series mutually interleaved so that control of the CPU of each computer switches back and forth between its respective local task and its respective remote subtask. This switching occurs so rapidly that each computer executes its respective local task concurrently and effectively simultaneously with its respective remote subtask. The plurality of computers of the network also execute simultaneously and in parallel with respect to each other. Each workstations user perceives no substantial delay in the interactive foreground execution of his own local task notwithstanding that his computer along with others in the network are concurrently executing remote parallel subtasks in the background.

The term "foreground" in the specification and claims is used in its ordinary sense generally understood by those skilled in the computer art to mean a mode of operation in which an executing process is visibly interacting with the user, so that the process has control of the console and responds to commands issued from the keyboard or other interactive input device. Conversely, the term "background" in the specification and claims is used in its ordinary sense generally understood by those skilled in the computer art to mean a mode of operation in which an executing process is not visibly interacting with the user and is without control of the interactive input/output devices, and that some other process is executing in the foreground.

DETAILED DESCRIPTION

Figure 1:
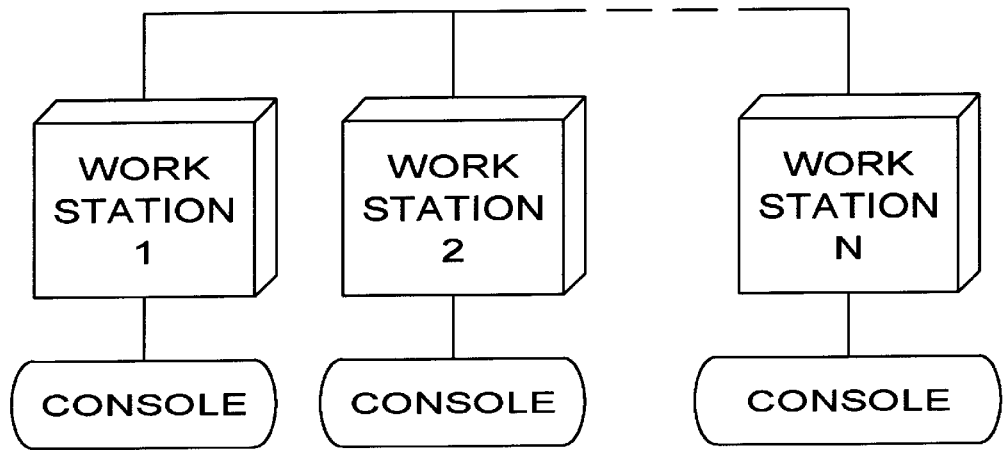
FIG. 1 is a block diagram showing the overall network comprising a plurality of interconnected workstations or personal computers.

Referring first to FIG. 1, this is a block diagram depicting an LAN (local area network) of interconnected computers which may be either workstations or personal computers. The network may be either a peer-to-peer type or a client-server type. Each computer comprises a console including a keyboard and a CRT display monitor for interactive operation of the computer by the respective user. For simplicity in illustration, the computers are shown connected in series by a single linear cable, as in an ethernet system, but any other conventional arrangement such as a token ring topology may be employed instead.

Figure 2:
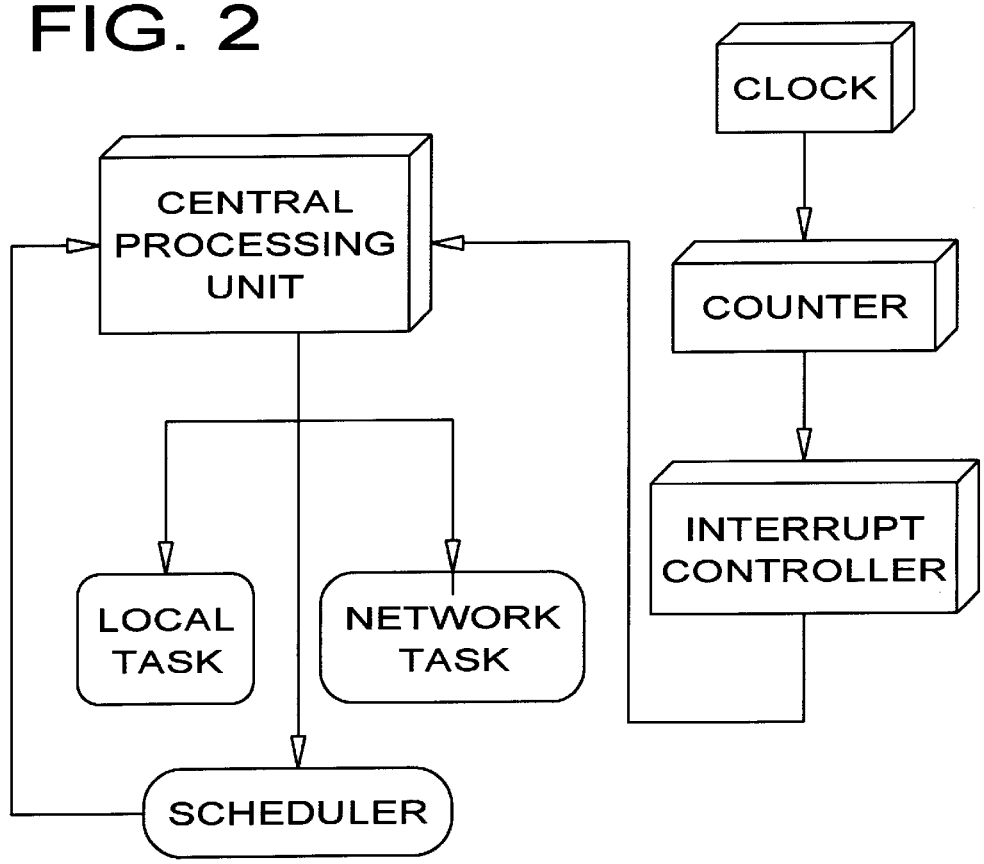
FIG. 2 is a block diagram showing for each of the computers the relation between the relevant hardware components comprising the CPU, clock, counter and interrupt controller, and the relevant executable software components comprising the scheduler, local task and network task.
Figure 3:
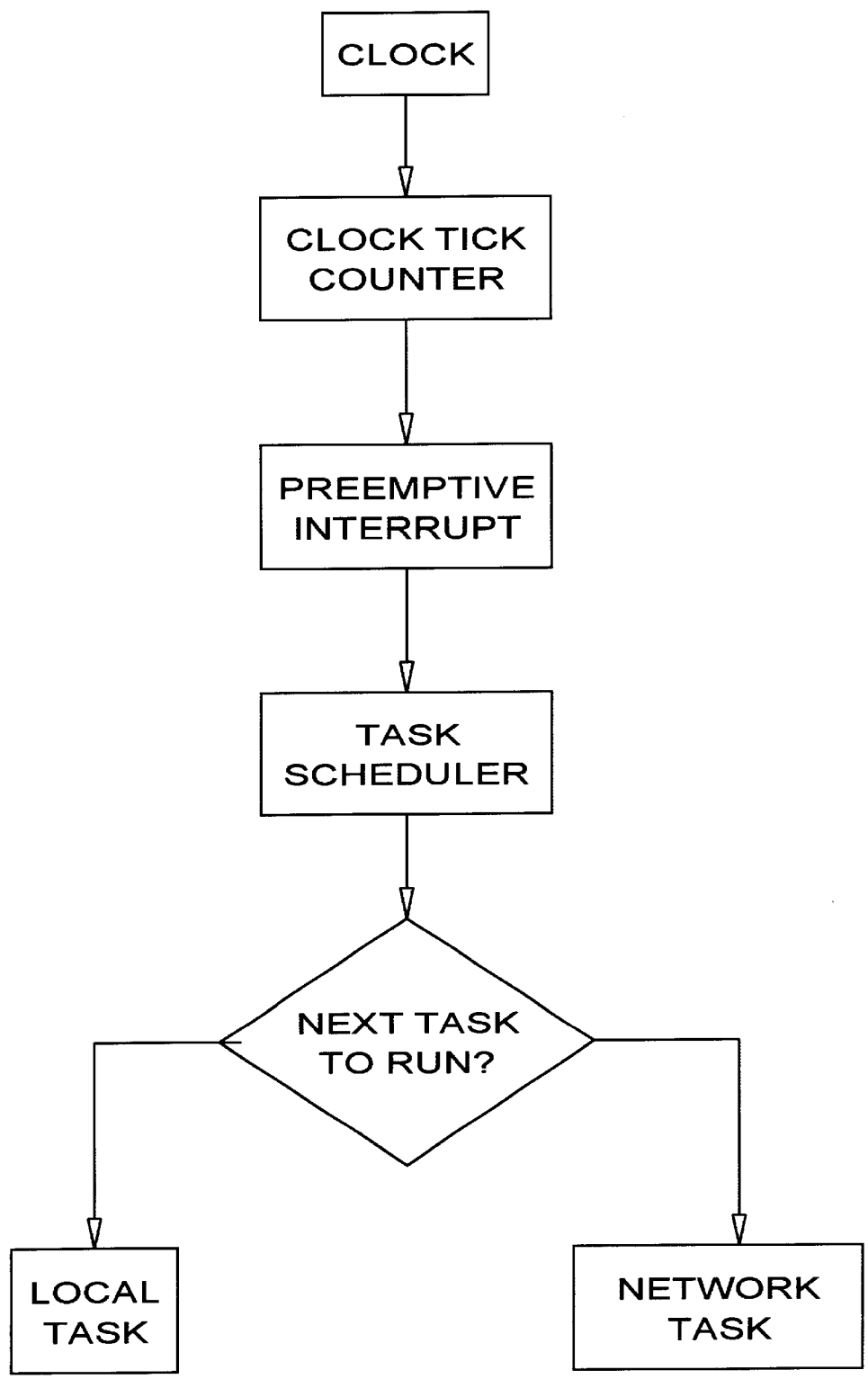
FIG. 3 is a flow chart showing the sequence of operations starting with the clock and extending to the execution of the local and network tasks alternately selected by the scheduler.

Referring now to FIG. 2, this is a block diagram showing the relation of the relevant hardware and software components of each computer of the network. In FIG. 3 there is shown a flowchart of the overall sequence of operations of these components. A clock periodically emits timing pulses or ticks at a fixed high frequency. A counter tallies the clock ticks until the total reaches a predetermined number which determines the time duration of each timeslice. This timeslice duration is preferably about 20 milliseconds. When the end of the current timeslice is thereby determined by the counter the latter then signals the interrupt controller which in turn activates the interrupt input of the CPU (central processing unit) to initiate an interrupt operation.

This causes the contents of the CPU registers to be stored in memory and control of the CPU is taken away from the executing task which is thereby asynchronously preempted. Control of the CPU is then passed to an interrupt service routine which contains or invokes the scheduler for a determination as to the next task to be executed. If the just preempted task had been a local task the scheduler will proceed to select a network task as the next one to be executed, and conversely, if the preempted task had been a network task then the scheduler will proceed to select a local task. The term "local task" refers to a task which is executed solely by a respective individual computer independently of the network. The term "network task" refers to a task which is originated by one computer of the network for distribution to and execution by other computers of the network. For example, a network task may be a subtask resulting from the partition of a large compute-intensive task into many subtasks for parallel processing by a plurality of the network workstations.

The scheduler signals its task selection to the CPU which then normally executes either the scheduled local task or the scheduled network task, as determined by the scheduler, for the next successive timeslice. At the start of the next timeslice the counter is reset and the above-described cycle of operation is iterated over and over again as long as the computer remains in operation with local and network tasks still to be executed.

The repeated activation of the interrupt operation thereby creates at least two series of timeslices of execution, with the timeslices of one series interleaved with the timeslices of at least one other series. During each timeslice of one series a local task is given control of the CPU and is executed piecemeal to perform a successive portion of the local task, while interleaved with this piecemeal execution of the local task are the successive timeslices of another series during each timeslice of which a successive portion of a network task is executed piecemeal. That is, control of the CPU is rapidly switched back and forth between a local task and a network task so rapidly that the two tasks are said to be running concurrently and effectively simultaneously. A user operating interactively with his workstations console may thus run a local task in the foreground, while concurrently in the background a network task is being executed without the user's awareness. Generally this occurs without any perception by the user that his interactive foreground task is being substantially delayed by this multitasking.

This background execution of network tasks is particularly suited for the parallel multiprocessing of large compute-intensive programs which frequently arise in science, engineering, financial analysis, graphics and other fields. The workstations or personal computer originally given such a task may partition the data and program code into a plurality of subtasks. A plurality of subtask identifiers corresponding to the partitioned subtasks are stored in a network directory of a disk drive of one of the computers to constitute a pool or queue identifying remote subtasks to be executed. As explained in more detail below, each computer of the network may access this pool, select a subtask identifier, copy the corresponding remote subtask from the originating computer, execute the subtask in the background without substantial delay of its local processing, and return the computed subtask results to the originating computer.

As a result most of the computer time and processing power of the entire network which would otherwise be wasted while waiting for slow input/output operations is instead put to valuable use in the form of a powerful parallel multiprocessing system able to handle tasks which would overwhelm an individual workstations or personal computer. For example, if a very large matrix of floating point numbers is required to be processed, the matrix may be partitioned by rows and/or columns into a pluralty of submatrices each of which, together with a subprogram of processing code, would constitute a subtask, so that a plurality of the network computers may each process a respective one of the submatrices in parallel with the processing of the other submatrices by other computers of the network.

Figure 4:
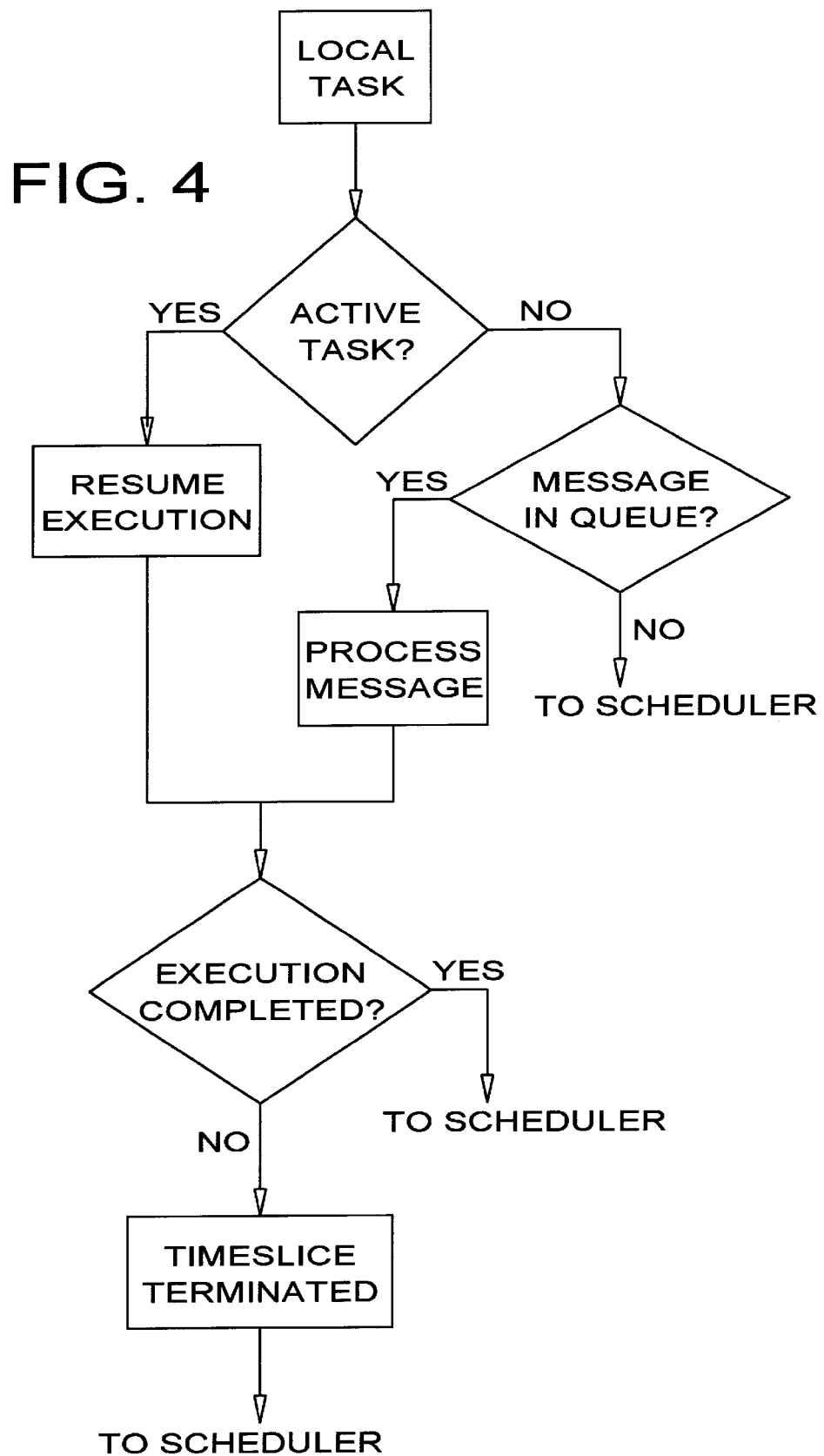
FIG. 4 is a flow chart showing the further sequence of operations when the scheduler proceeds to select the local task for execution.

Referring now to FIG. 4, this is a flow chart showing the further sequence of operations which occurs when the scheduler of a particular computer proceeds to select its respective local task for execution during the next timeslice. The decision block with the legend ACTIVE TASK? represents a determination as to whether there is presently any local task which is concurrently being executed. If this determination is affirmative then the execution of this local task is resumed during the next timeslice. If this determination is negative then the message queue is checked for the presence of a message, as indicated by the decision block marked MESSAGE IN QUEUE? If a message is present it is processed during the next timeslice. If no message is waiting in the message queue control is returned to the scheduler which then proceeds to pass control of the CPU to a network task, as will be described below in connection with FIG. 5.

The resumed execution of the previously active local task or the execution invoked by the processed message continues until either the execution is completed or is preempted by the next activation of the interrupt operation. If the execution of the local task is completed before the next interrupt activation the control of the CPU is returned to the scheduler. Otherwise execution continues until the interrupt operation is activated to terminate the timeslice and return control of the CPU to the scheduler. The local task is thereby preempted but will eventually resume execution during a subsequent timeslice.

Figure 5:
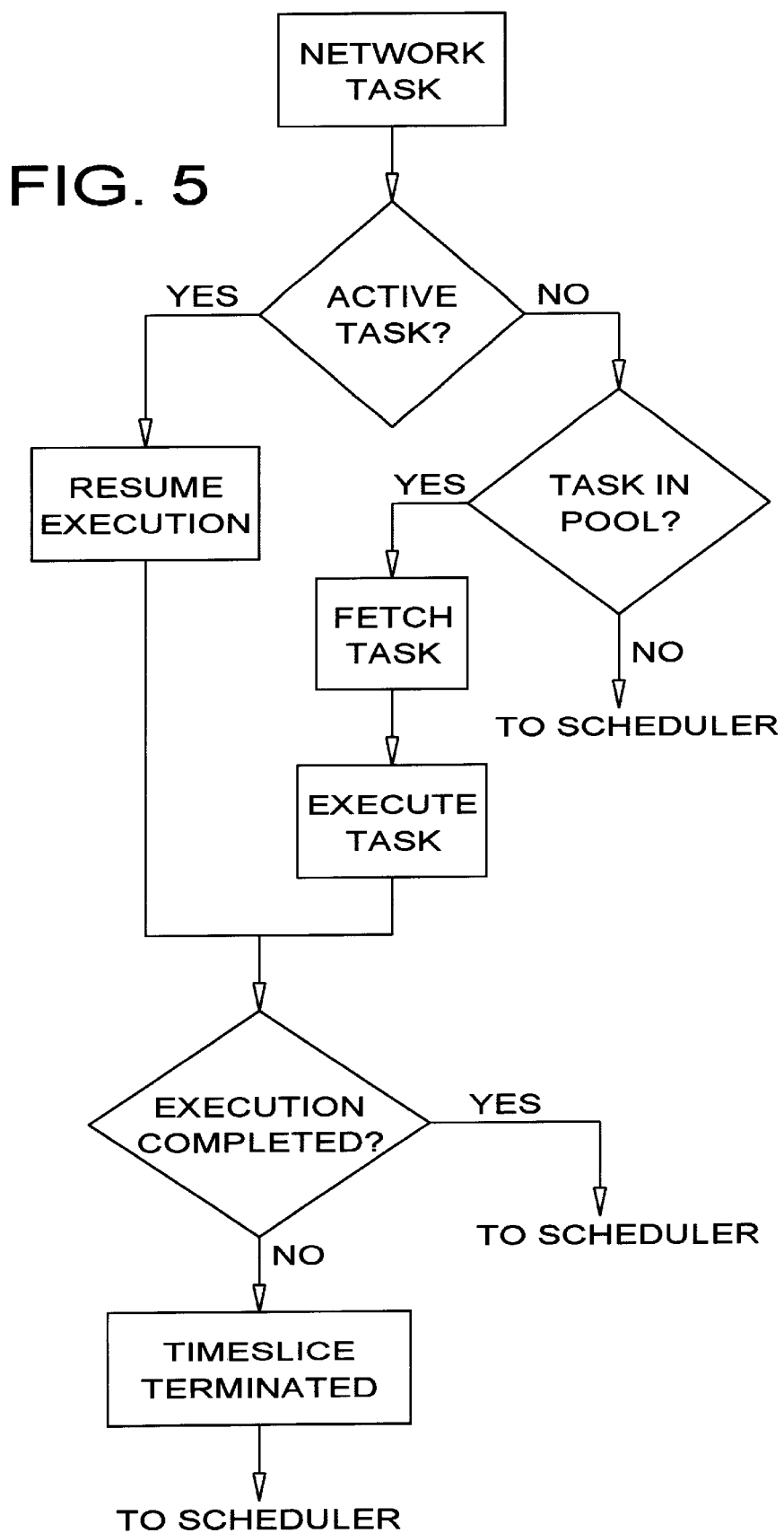
FIG. 5 is a flow chart showing the further sequence of operations when the scheduler proceeds to select a network task for execution.

Referring now to FIG. 5, this is a flow chart showing the further sequence of operations which occurs when the scheduler proceeds to select a network task for execution during the next timeslice. As explained above, this network task may be a remote subtask originating from the partition of a large compute-intensive task by another computer of the network. The decision block marked with the legend ACTIVE TASK? represents a determination as to whether there is a network task presently running. If the determination is affirmative then execution of this network task is resumed for the next timeslice.

If the determination is negative then the pool of subtask identifiers is checked to determine if there is a remote subtask or other network task waiting for execution, as indicated by the decision block marked TASK IN POOL? If the pool contains a task identifier then the latter is removed from the pool. If the network is a peer-to-peer type the network task corresponding to the identifier is copied from the disk drive of the other workstations which originally placed the network task in the pool, as indicated by the legend FETCH TASK. If the network is a client-server type then both the subtask identifier pool and the suprograms constituting the subtasks are stored on a server computer and the subtasks are fetched from the latter. The fetched remote subtask or other network task is then executed. The computed results from the execution of each subtask are placed into files which are stored in a network directory which may be accessed by the workstations which originally partitioned and distributed the compute-intensive task.

Execution of either the resumed network task or the newly fetched network task continues until either the task is completed or, as is more usually the case, the task is preempted by the termination of the timeslice at the next activation of the interrupt operation. Control of the CPU is then returned to the scheduler. The cycle of operation described above is then repeated over and over again by each workstations (or personal computer) for so long as the computer remains in operation with local and network tasks to be executed.

The preferred embodiment of the invention disclosed herein is merely illustrative of one of the many forms which the invention may take in practise without departing from the scope of the invention as delineated in the appended claims which are to be construed as broadly as permitted by the prior art.

I claim:

1. A computer network system for parallel computation and comprising a network of interconnected personal computer workstations each having means for executing a respective local task, at least one of said personal computer workstations having stored therein a compute-intensive program and having means for partitioning said compute-intensive program into a plurality of remote subtasks for execution by other computers of said network, said personal computer workstations each having means for executing a respective one of said remote subtasks in parallel with the execution of the other remote subtasks by the other computers, each of said personal computer workstations including:

(1) a central processor having an interrupt operation, (2) a clock timer for periodically activating said interrupt operation at brief predetermined time-sliced intervals so as to asynchronously interrupt the execution of an executing task and to take therefrom control of the central processor upon each said activation of said interrupt operation, and (3) an interrupt service routine responsive to each said clock timer activation of said interrupt operation for passing control of the central processor to another task for execution of the latter, said clock timer, interrupt operation and interrupt service routine of each computer coacting to switch control of the respective central processor repeatedly back and forth between a local task and a remote subtask so rapidly that the respective local task and remote subtask execute effectively simultaneously.

2. A system as recited in claim 1 wherein each of said personal computer workstations comprises means for the execution of a respective local task in the foreground during each timeslice of a first series of spaced timeslices while concurrently therewith a respective one of said subtasks is executed in the background during each timeslice of a second series of spaced timeslices interleaved with said first series of timeslices.

3. A system as recited in claim 1 wherein each of said computers has a keyboard and a display monitor for interactive operation by a user, each said local task being executed interactively with the user in the foreground while concurrently therewith the respective subtask is being executed in the background, each said preemptive multitasking means rapidly switching execution of the computer back and forth between said foreground task and said background subtask so that the foreground task and background subtask are effectively executed simultaneously and so that during the interactive execution of the foreground task the user perceives no substantial delay or interference from the concurrent execution of the background subtask.

4. A system as recited in claim 1 and comprising a network directory for storing files accessible by other computers of the network, said partitioning means including means for storing each of said subtasks as a file in said network directory, each computer having a disk drive and means for copying a subtask file from said network directory and into the respective disk drive of said computer.

5. A system as recited in claim 1 wherein said network comprises a disk drive having a file including a pool of subtask identifiers, said partitioning means including means for storing in said pool an identifier corresponding to each said subtask, each computer including means responsive to the completion of execution of a subtask to select for execution a new subtask from said pool.

6. A computer network system for distributed parallel computation concurrently with local computation, said system comprising a network of interconnected computers each including:
(1) a microprocessor having an interrupt input,
(2) clock driven means for periodically activating said interrupt input at brief predetermined time intervals so as to asynchronously interrupt the execution of an executing task upon each activation of said interrupt input,
(3) an interrupt service routine for preemptively taking control of the microprocessor in response to each said activation of said interrupt input and including means for passing control of the microprocessor to another task,
(4) operator actuated means for interactively controlling the execution of a program task, and
(5) display means for interactively showing to the operator effects of said interactive control by said operator actuated means, whereby a task of a program may execute interactively with the operator in the foreground while another task executes in the background concurrently with the interactive execution of the foreground task, at least one of said computers having a program stored therein, means for partitioning said program into a plurality of remote tasks for execution by other computers of the network, means for transferring each of said remote tasks to a respective computer of the network, each of said computers having means for executing its respective remote task in parallel with the execution of the other remote tasks by the other computers, each of said remote tasks being executed by its respective computer as a background task while concurrently therewith the computer executes a respective local task in the foreground interactively with the operator, said clock driven means and interrupt service routine of each computer coacting to constitute a preemptive multitasking means for switching control of the microprocessor repeatedly between the foreground local task and the background remote task so rapidly that an interactive operator perceives the local task to be executing without delay or interference by the execution of the respective remote task in the background.

7. A system as recited in claim 6 wherein each of said preemptive multitasking means provides for the execution on each computer of a respective local task in the foreground during each timeslice of a first series of spaced timeslices while concurrently therewith a respective one of said subtasks is executed in the background during each timeslice of a second series of spaced timeslices interleaved with said first series of timeslices.

8. A system as recited in claim 6 wherein each of said computers has a keyboard and a display monitor for interactive operation by a user, each said local task being executed interactively with the user in the foreground while concurrently therewith the respective subtask is being executed in the background, each said preemptive multitasking means rapidly switching execution of the computer back and forth between said foreground task and said background subtask so that the foreground task and background subtask are effectively executed simultaneously and so that during the interactive execution of the foreground task the user perceives no substantial delay or interference from the concurrent execution of the background subtask.

9. A system as recited in claim 6 and comprising a network directory for storing files accessible by the other computers, said partitioning means including means for storing each of said subtasks as a file in said network directory, each computer having a disk drive and means for copying a subtask file from said network directory and into the respective disk drive of said computer.

10. A system as recited in claim 6 wherein said network comprises a disk drive having a file including a pool of subtask identifiers, said partitioning means including means for storing in said pool an identifier corresponding to each said subtask, each computer including means responsive to the completion of execution of a subtask for selecting for execution a new subtask from said pool.

* * * * *